March 4, 1952  S. W. HOSKINS  2,587,728
LOADING MEANS FOR PRESSURE REGULATORS
Filed Jan. 8, 1945  2 SHEETS—SHEET 1

INVENTOR.
STANLEY W. HOSKINS
BY
Paul D. Flehr

March 4, 1952  S. W. HOSKINS  2,587,728
LOADING MEANS FOR PRESSURE REGULATORS
Filed Jan. 8, 1945  2 SHEETS—SHEET 2

INVENTOR
STANLEY W. HOSKINS
BY
Paul D. Flehr

Patented Mar. 4, 1952

2,587,728

UNITED STATES PATENT OFFICE 2,587,728

LOADING MEANS FOR PRESSURE REGULATORS

Stanley William Hoskins, London, England, assignor, by mesne assignments, to Grove Regulator Company, a corporation of California Application January 8, 1945, Serial No. 571,719
In Great Britain July 19, 1944

7 Claims. (Cl. 50—21)

This invention relates to improvements in apparatus for controlling the flow of fluid and, more particularly, to fluid pressure regulators of the type in which a flexible diaphragm operating one or more valve elements is loaded by the pressure of a gas confined in a sealed chamber such as is described, for example, in British Patent No. 532,465.

One of the objects of the present invention is to provide an improved form of equipment or fluid pressure regulator having an adjustable loading means capable of being adjusted by an operator for maintaining any one of a wide variety of pressures.

In accordance with the invention there is provided a pressure regulating apparatus comprising valve means having associated therewith an operating diaphragm wherein the latter is loaded by the pressure of a volume of air or gas confined in a sealed chamber and means is provided for varying the volumetric capacity of the chamber in order to alter or adjust the pressure loading of the said operating diaphragm.

The invention also consists in a pressure regulating apparatus comprising valve means having associated therewith an operating diaphragm wherein the latter is loaded by the pressure of a volume of air or gas confined in a sealed chamber and manually operable means is provided for effecting the displacement of an element towards or away from the diaphragm in such manner as to vary the volumetric capacity of said chamber in order to alter or adjust the pressure loading of the said diaphragm.

The pressure of the confined volume of air or gas may be applied in either one of two ways, the air or gas itself may be applied to the flexible diaphragm, or the pressure may be applied to the diaphragm through a pressure transmitting member having the sealed chamber formed partly therein.

In order that the said invention may be clearly understood and readily carried into effect, the same will now be more fully described with reference to the accompanying drawings in which—

Figure 1:
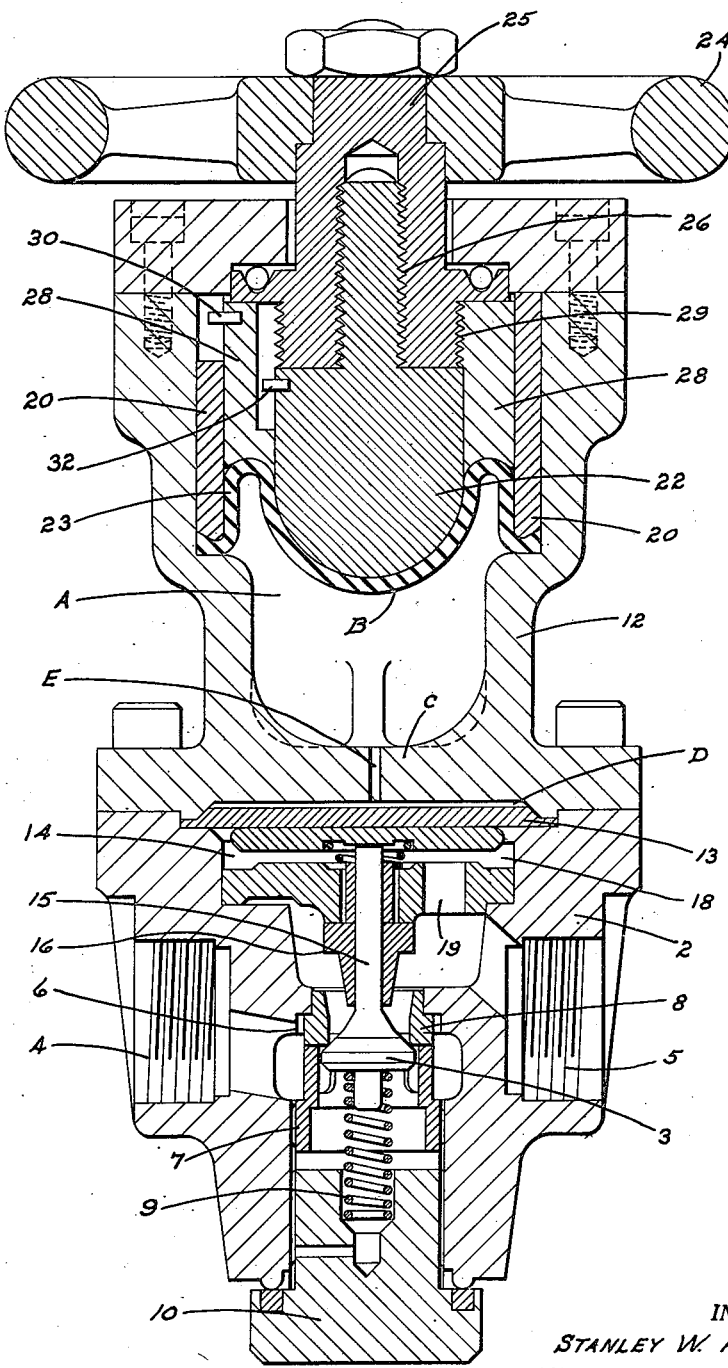
Figure 2:
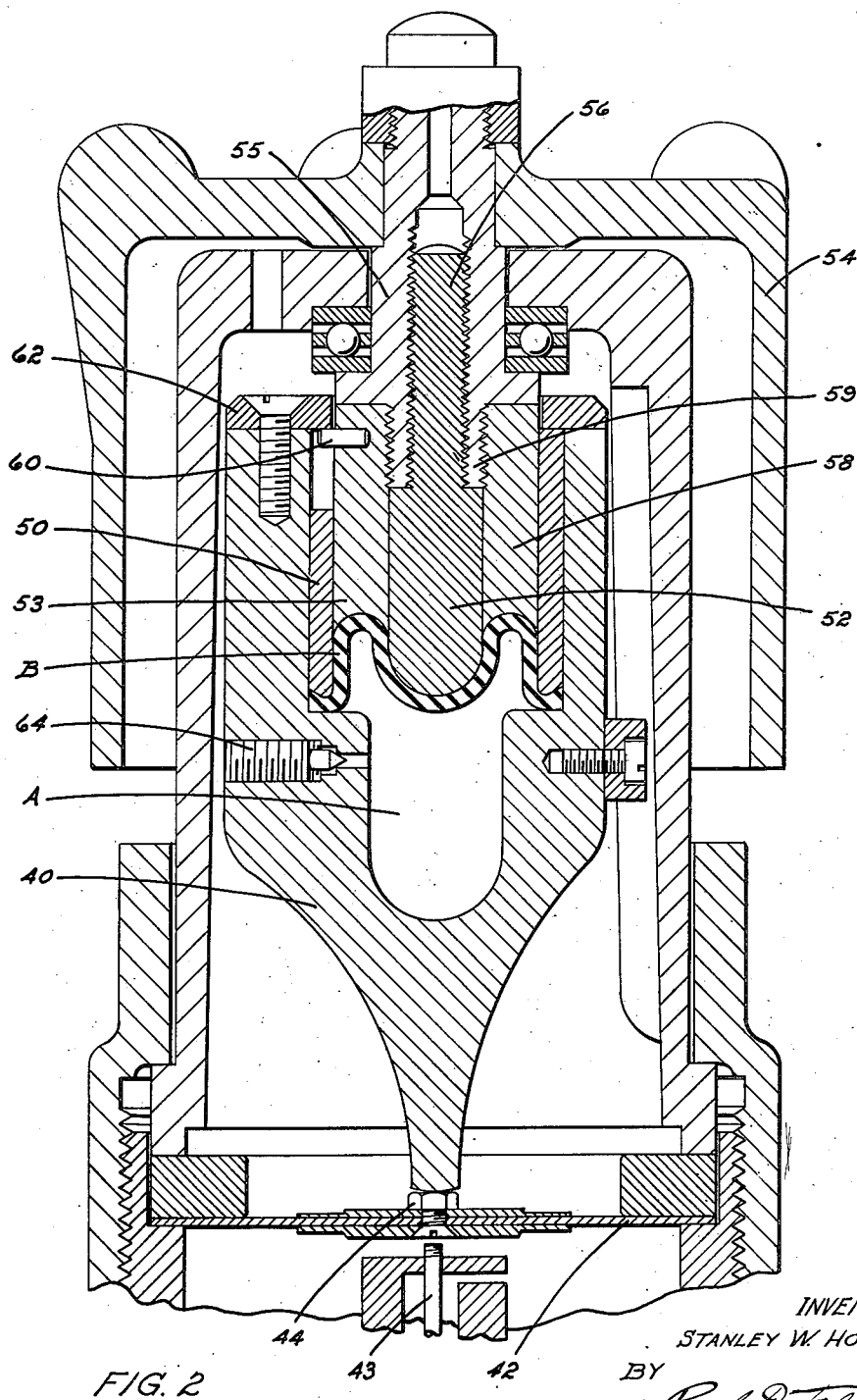

Fig. 1 is a view showing in section one form of regulator incorporating the invention; and Fig. 2 is a view showing another mode of carrying the invention into effect.

In Fig. 1 of the accompanying drawings, there is shown one mode of applying the invention to a regulator of the direct acting type, that is, without a so-called pilot valve. Such regulator comprises a valve body 2 accommodating an axially displaceable valve element 3 which may be of any convenient form. As shown, the valve body is provided with inflow and outflow openings 4 and 5 respectively and with a bore 6 accommodating a valve cage 7 which is threaded in position in an opening formed in the lower end of the valve body and serves to hold in position an annular element 8 provided with a valve seat with which the valve element cooperates. Beneath the valve element there is arranged a compression spring 9 affording a suitable bias of substantially constant value for normally retaining the valve element in closed position, said spring being held in position by a sealed closure plug 10.

At its upper part the valve body is enlarged to provide the same with an annular flange to which is secured as by means of bolts the lower part of a housing 12 in which the aforesaid compression chamber shown at A is formed. Carried by the upper part of the valve body, with its marginal edge clamped between the valve body and the superposed housing 12, there is a flexible diaphragm 13. The material utilised for such diaphragm will depend upon the purpose for which, and the manner in which the regulator is used but, in most instances, it may be constituted by a suitably reinforced rubber or rubber-like material. Positioned upon the upper and lower sides of the diaphragm are a pair of rigid discs composed, for example, of metal, the arrangement being such that the discs are securely clamped together upon opposite sides of the diaphragm so as to leave a marginal diaphragm portion 14 free for flexing movements. As the discs move with the diaphragm, they can be regarded as forming a part of the diaphragm structure, and, as will be seen, the valve element 3 is provided with a valve stem 15 which extends upwardly therefrom through a guide 16 and abuts at its upper end against the central portion of the underside of the lower disc of the diaphragm structure.

It will be appreciated that when the value element is displaced with respect to its seating, pressure fluid is permitted to flow from the inlet 4, through suitable ports leading to the underside of the valve, past the valve element and then through other ports in communication with the outlet 5.

In a typical regulator, the space 18 provided beneath the diaphragm structure is connected with the outflow side as, for example, by a duct 19.

In the structure produced according to the present invention, the diaphragm loading is constituted by a trapped volume of air or gas under pressure contained in the compression chamber A and a manually operable means is provided for varying the volumetric capacity of such chamber in order to adjust the pressure loading. For this purpose, the upper part of the housing 12 is enlarged and has arranged therein so that it is held firmly at its peripheral edge, a resilient element or compression sock B which may be composed of rubber or other suitable material and is adapted to seal the upper end of the compression chamber and to form a closure thereto of such a nature that its central portion may be displaced towards or away from the diaphragm structure so as to vary the volumetric capacity of said compression chamber. The peripheral edge of the sock B may be held in position by means such as a clamping ring 20 and, for the purpose of effecting the displacements of the central portion of the resilient element, there is preferably provided an axially displaceable plug or piston element 22 which is rounded at its lower end as shown. The arrangement is also preferably such that the resilient element is adapted to envelope the rounded end of the piston element and to provide between the same and its clamped peripheral edge a rolled-over or U-shaped annular portion 23.

For effecting the displacements of the piston element, a handwheel 24 is preferably provided. For example, the said handwheel may be suitably secured to the upper end of a spindle 25 provided with an internally screw-threaded portion engaging with a corresponding screw-thread formed exteriorly upon a spigot or extension 26 which extends upwardly from the piston element so that, upon rotation of the hand wheel, the piston element will be raised or lowered. For each unit movement of the piston, there will be only one half of a unit of movement of the rolled-over or U-shaped annular portion 23 of the compression sock and, as owing to the high pressures involved it is important that the sock should be supported at all times over the whole or substantially the whole of its operative surface, the annular portion 23 is preferably backed by a sleeve 28 which is shaped at its end to fit or bear against this portion of the sock and is adapted to be displaced with the piston element but by an amount equal to one-half of the displacement of the latter. For this purpose, the lower end of the spindle 25 may be formed with a portion 29 which is screw-threaded exteriorly so that the threads have one-half of the pitch of those provided on the spigot 26 and which engages with a corresponding screw thread formed interiorly within the upper end of the sleeve 28. Also, the latter is provided with means for restraining the same from angular movement as, for example, by the provision of a lateral projection or pin 30 slidable in a slot formed longitudinally in the clamping ring 20, which slot may also serve to limit the extent to which the sleeve may be displaced axially. The piston element is preferably formed with a similar projection or pin 32 slidable in a slot formed in the inner face of the sleeve 28 and this slot may be adapted to limit the extent to which the piston element may be displaced axially and prevent radial movement of the piston.

It will be observed that the construction allows for considerable variations in the volumetric capacity of the compression chamber thus enabling a large range of operating pressures to be provided for. It will be appreciated that suitable means are provided for enabling the compression chamber to be charged with the requisite initial pressure fluid and that, if desired, a pressure gauge for registering the pressure prevailing within the compression chamber may be provided.

From the foregoing, it is apparent that fluid pressure in the space 18 tends to urge the diaphragm 13 in a direction to close the valve element while the pressure in the compression chamber tends to urge the diaphragm in a direction to open the valve element. Pressure in the space 18 is of course varied in accordance with variations on the outflow side of the regulator, while the pressure in the compression chamber remains constant unless and until adjusted by the manually operable means described and serves in effect to form a bias on the diaphragm and the valve element to determine the outflow pressure to be maintained.

In addition to the bias afforded by the pressure within the compression chamber, means is provided for preventing abrupt flexing movements of the diaphragm, with attendant abrupt movements of the valve member from or against its seat. Such means are constituted by providing the lower part of the compression chamber with a rigid baffle wall C which may conveniently be formed by the base of the housing 12 and which is shaped and formed so that it follows the contour of the upper surface of the diaphragm structure and is spaced slightly therefrom to provide between these members a relatively small clearance space D which is sealed except that it has restricted communication with the compression chamber of which it is, in effect, a part, by means of an orifice E. The latter is so dimensioned as materially to impede the flow of the pressure medium into the space D from the main part of the compression chamber, whereby abrupt movement of the valve member is retarded or prevented.

In operation, the inflow opening 4 may be connected with a source of relatively high pressure, e. g. a pressure of the order of 3,500 lbs. per square inch and the pressure to be maintained on the outflow side may be of a much lower order e. g. of the order of 200 lbs. per square inch. Under these conditions, the pressure within the compression chamber will be adjusted to correspond with the desired outflow pressure and it will be understood that when no gas is being discharged from the outflow side, the regulator will be in a static condition with the valve element engaging its seating and with the diaphragm at its upper limit of movement. The pressure in the clearance space D will then correspond with the pressure in the remainder of the compression chamber. When a flow of gas is established from the outflow side of the regulator, there will be a tendency for the valve member to pop open and to cause a sudden surge of fluid to flow through the regulator. This tendency is, however, rendered ineffective as upon initial opening movement of the valve member there will be produced, by virtue of the lower pressure in the space 18, a rapid increase in the volume of the clearance space D with the result that the gas pressure in the latter space will be considerably reduced. Such rapid reduction of pressure upon the upper side of the diaphragm which occurs indenpendently of the relatively constant pressure in the remainder of the compression chamber, necessarily immediately alters the initial resulting force tending to urge the diaphragm downwardly with the result that opening movement of the valve member is checked and this member does not move so far as to cause a detrimental surge of gas to flow through the regulator. Consequently, under such conditions, the outflow pressure will remain substantially at the desired value irrespective of the suddenness with which the demand is imposed.

Thus, it will be appreciated that the regulator will function smoothly to give accurate regulation under various conditions of working and that by adjustment of the manually operable means described, the pressure value maintained on the outflow side may be varied between wide limits.

As mentioned above, in some instances, instead of the pressure of the confined volume of air or gas being itself applied to the flexible diaphragm, it may be applied thereto through the medium of a pressure transmitting member having the sealed chamber formed partly therein. Thus, for example, as is shown by way of example in Fig. 2, the compression chamber A may be formed in an axially displaceable pressure applying or transmitting member 40 having one end thereof shaped, formed and arranged to bear against a diaphragm element 42 adapted when displaced to engage a valve stem or spindle 43 for the purpose of actuating one or more valve members. The latter may be of any convenient form, and, if desired, the lower end of the pressure transmitting member 40 may be shaped to provide the same with a blunt point bearing against a nut 44 in the centre of the diaphragm, said nut serving to clamp a thin steel disc on each side of the diaphragm so as to avoid undue local strain thereon. The valve assembly provided beneath the diaphragm is brought up to the underside of the diaphragm to an appropriate operating position in such manner that the downward stretching of the diaphragm is properly limited to avoid damage to or bursting of the diaphragm by the power exerted by the member 40.

As will be seen, the upper end of the compression chamber is closed and sealed by a resilient element or compression sock B which is similar to that shown in Fig. 1 and forms a closure to the compression chamber of such a nature that its central portion may be displaced towards or away from the diaphragm structure so as to vary the volumetric capacity of said compression chamber and the diaphragm loading. The peripheral edge of the sock B may be held in position by means such as a clamping ring 50 and, for the purpose of effecting displacements of the central portion of the resilient element, there is provided an axially displaceable plug or piston element 52 having a rounded end, the arrangement being such that, as before, the resilient element envelopes said rounded end and a rolled-over or U-shaped annular portion 53 is provided between the plug and the clamping ring.

For effecting the displacements of the piston element, a manually operable or rotatable member 54 is provided preferably in the form of a cap or cup. For example, the member 54 may be suitably secured to the upper end of a spindle 55 provided with an internally screw-threaded portion engaging with a corresponding screw thread formed exteriorly upon a spigot or extension 56 which extends upwardly from the piston element so that, upon rotation of the member 54, the piston element will be raised or lowered. Here again, for each unit movement of the piston, there will be only one half of a unit of movement of the rolled-over portion 53 of the compression sock and such portion is backed by a sleeve 58 fitted within the clamping ring and adapted to be displaced with the piston element but by an amount equal to one-half of the displacement of the latter. For this purpose, the lower end of the spindle 55 may be formed with a portion 59 which is screw-threaded exteriorly so that the threads have one-half of the pitch of those provided on the spigot 56 and which engages with a corresponding screw thread formed interiorly within the upper end of the sleeve 58. Also, the latter is provided with means such as the pin 60 for restraining the same from angular movement, said means or pin being slidable in a slot formed longitudinally in the clamping ring, which slot may also serve to limit the extent to which the sleeve may be displaced axially. The clamping ring may be retained in position in the power transmitting member by a top plate 62 the underside of which is adapted to be engaged by the pin 60 when the piston element is in its outer position.

Suitable means such as a loading port 64 are provided for enabling the compression chamber to be charged initially with the requisite pressure fluid.

It will be appreciated that the diaphragm element 42 is suitably held or clamped at its peripheral edge.

I claim:

1. In a flow control device of the type including a body having passages for flow of fluid through the same together with a valve means within the body serving to control fluid flow and a flexible diaphragm arranged to operate the valve means; loading means comprising a housing forming a closed gas chamber, and adjustable displacement means carried by the housing and forming one wall of said chamber, said last means comprising a plunger carried by the housing for movements in directions towards or away from the interior of the chamber, the inner end of the plunger being rounded, a circularly contoured resilient element having its central portion normally conforming to the rounded end of the plunger and having a peripheral edge of the same sealed with respect to the housing, said element having an annular portion of the same disposed between the plunger and the housing and substantially U-shaped in cross-sectional contour.

2. In a flow control device of the type including a body having passages for flow of fluid through the same together with a valve means within the body serving to control fluid flow and a flexible diaphragm arranged to operate the valve means; loading means comprising a housing forming a closed gas chamber on one side of the diaphragm for applying loading force to the same, and adjustable displacement means carried by the housing and forming one wall of said chamber, said last means comprising a plunger extending into the housing and capable of movement in a direction towards or away from the interior of the chamber, the inner end of the plunger being rounded, a sleeve disposed about the plunger and intermediate the plunger and the adjacent wall of the housing, a circularly contoured resilient element having its central portion normally conforming to the rounded end of the plunger and having a peripheral edge of the same sealed with respect to the housing, said element having an annular portion of the same bent to substantially U-shaped cross-sectional contour, said portion being interposed between the plunger and the housing and abutting the inner end of said sleeve.

3. A flow control device as in claim 2 together with means operable from the exterior of the housing for effecting conjoint movement of both the plunger and said sleeve.

4. A flow control device as in claim 2 together with means manually operable from the exterior of the housing for effecting conjoint movements of the plunger and the sleeve, the rate of movement of the sleeve being relatively less than the rate of movement of the plunger.

5. In fluid pressure loading means used to apply a loading force to one side of a diaphragm serving to operate a fluid flow control valve, a housing forming a closed gas chamber, a plunger carried by the housing for movements in directions towards or away from the interior of the chamber, the inner end of the plunger being rounded, a circularly contoured resilient element having its central portion normally conforming to the rounded end of the plunger and having a peripheral edge of the same sealed with respect to the housing, said element having an annular portion of the same disposed between the plunger and the housing and substantially U-shaped in cross-sectional contour.

6. In fluid pressure loading means used to apply a loading force to one side of a diaphragm serving to operate a fluid flow control valve, a housing forming a closed gas chamber, a plunger carried by the housing extending into the chamber and capable of movement in a direction towards or away from the interior of the chamber, the inner end of the plunger being rounded, a sleeve disposed about the plunger and intermediate the plunger and the adjacent wall of the housing, a circularly contoured resilient element having its central portion normally conforming to the rounded end of the plunger and having a peripheral edge of the same sealed with respect to the housing, said element having an annular portion of the same bent to substantially U-shaped cross-sectional contour, said portion being interposed between the plunger and the housing abutting the inner end of said sleeve.

7. A fluid pressure loading means as in claim 6 together with means operable from the exterior of the housing for effecting conjoint movement of both the plunger and said sleeve.

STANLEY WILLIAM HOSKINS.

REFERENCES CITED

The following references are of record in the file of this patent:

UNITED STATES PATENTS

| Number | Name | Date |
| --- | --- | --- |
| 2,082,325 | Cross | June 1, 1937 |
| 2,177,825 | Grove | Oct. 31, 1939 |
| 2,195,242 | Dow | Mar. 26, 1940 |
| 2,320,886 | Quiroz | June 1, 1943 |
| 2,417,256 | Kremiller | Mar. 11, 1947 |